VOICE COMMUNICATION SYSTEM

BANDWIDTH COMPRESSION SYSTEM

ALTERNATE BANDWIDTH COMPRESSION SYSTEM

INVENTOR.
HARVEY L. MORGAN
BY
Wm. H. Dean

INVENTOR.
HARVEY L. MORGAN
BY
Wm. H. Dean

FREQUENCY MULTIPLIER

SINGEL SIDEBAND MODULATOR BLOCK DIAGRAM

SINGLE SIDEBAND MODULATOR CIRCUIT DIAGRAM

INVENTOR.
HARVEY L. MORGAN
BY
Wm. H. Dean

FREQUENCY DIVIDER

5:1 FREQUENCY DIVIDER

FOUR- DIODE MIXER CIRCUIT

INVENTOR.
HARVEY L. MORGAN
BY
Wm. H. Dean

FREQUENCY EXPANDER SYSTEM BLOCK DIAGRAM

ALTERNATIVE FREQUENCY EXPANDER SYSTEM

ALTERNATIVE FREQUENCY EXPANDER SYSTEMS

INVENTOR.
HARVEY L. MORGAN
BY
Wm. H. Dean

Oct. 24, 1967 H. L. MORGAN 3,349,184

BANDWIDTH COMPRESSION AND EXPANSION BY FREQUENCY DIVISION AND MULTIPLICATION

Filed May 17, 1965 8 Sheets-Sheet 6

ELECTROMECHANICAL BANDWIDTH CHANGER

INVENTOR.
HARVEY L. MORGAN
BY
Wm. H. Dean

5-CHANNEL VOICE COMMUNICATIONS SYSTEM FOR 3 Kc TRANSMISSION BANDWIDTH

INVENTOR.
HARVEY L. MORGAN

BY

*Wm. H. Dean*

INVENTOR.
HARVEY L. MORGAN
BY
Wm. H. Dean

United States Patent Office 3,349,184
Patented Oct. 24, 1967

3,349,184
BANDWIDTH COMPRESSION AND EXPANSION BY FREQUENCY DIVISION AND MULTIPLICATION

Harvey L. Morgan, 5645 W. Mariposa, Phoenix, Ariz. 85031

Filed May 17, 1965, Ser. No. 456,465
4 Claims. (Cl. 179—15.55)

ABSTRACT OF THE DISCLOSURE

The specification discloses both electronic and electromechanical means of bandwidth compression and expansion by a factor *n*. Both means use a process of modulation of the original signal onto a carrier, frequency division or multiplication as required, and recovery of the desired signal, as required.

In frequency multiplication and division, amplitude-linear means are provided to prevent signal distortion. An electronic amplitude modulation system is used with single sideband modulation required to recover the desired signal. The electromechanical means uses frequency modulation of rotation frequency. Electronic frequency modulation of a carrier could be used rather than single sideband amplitude modulation in bandwidth compression and expansion systems.

This application is a continuation in part of my abandoned application, Serial No. 22,870, filed April 18, 1960.

This invention relates to a communication system and more particularly to bandwidth reduction systems for communication, in which the bandwidth required for transmission of a given signal (such as voice or video, but not restricted to these), is reduced for transmission but restored to the original form for use at the receiving end of the communication system. This invention may be used on signals where the bandwidth of the signal exceeds the bandwidth appropriate for the information rate of the signal. For example, a voice channel in commercial communications will have about three kilocycles per second of bandwidth, yet the bandwidth appropriate for the information rate is on the order of 100 cycles per second.

By communication system is meant means of transmitting signals from one position in space to another, or from one point in time to another. In the first case, information propagation might be by means of electrical signals on conductors, by means of electromagnetic waves propagated through space, by means of modulated light beams, or any other possible means of information transmission through space. In the second case, signal information might be recorded on one of the various media of signal information storage such as magnetic tape or wire, phonograph records, photographic film, cathode ray tube screens, or any other such media where signal information would later be recovered. An advantage of bandwith reduction for storage is that it takes less of the storage media to accurately reproduce the information.

It is an object of the present invention to reduce the bandwidth required to transmit signals in communication systems and then restore the signal to the original form at the receiver. It is further an object of the present invention to provide means for compressing and transmitting simultaneously several similar signals (for example, voice or video information) through signal transmission channels whose bandwidth, is normally appropriate for only one such uncompressed signal.

It is further the object of the present invention to improve the signal-noise ratio of the using communication systems wherein noise power is normally distributed evenly over a communication system bandwidth, whereby use of the present invention causes the bandwidth required for a given signal to be reduced from some factor *n*; whereupon, signal-to-noise ratios will be increased by the factor *n*.

It is a further object of this invention to relieve radio spectrum conjestion by allowing simultaneous non-interfering use of a transmission frequency by *n* signals, where *n* is the factor of bandwidth reduction of signals.

Figures 1, 2:
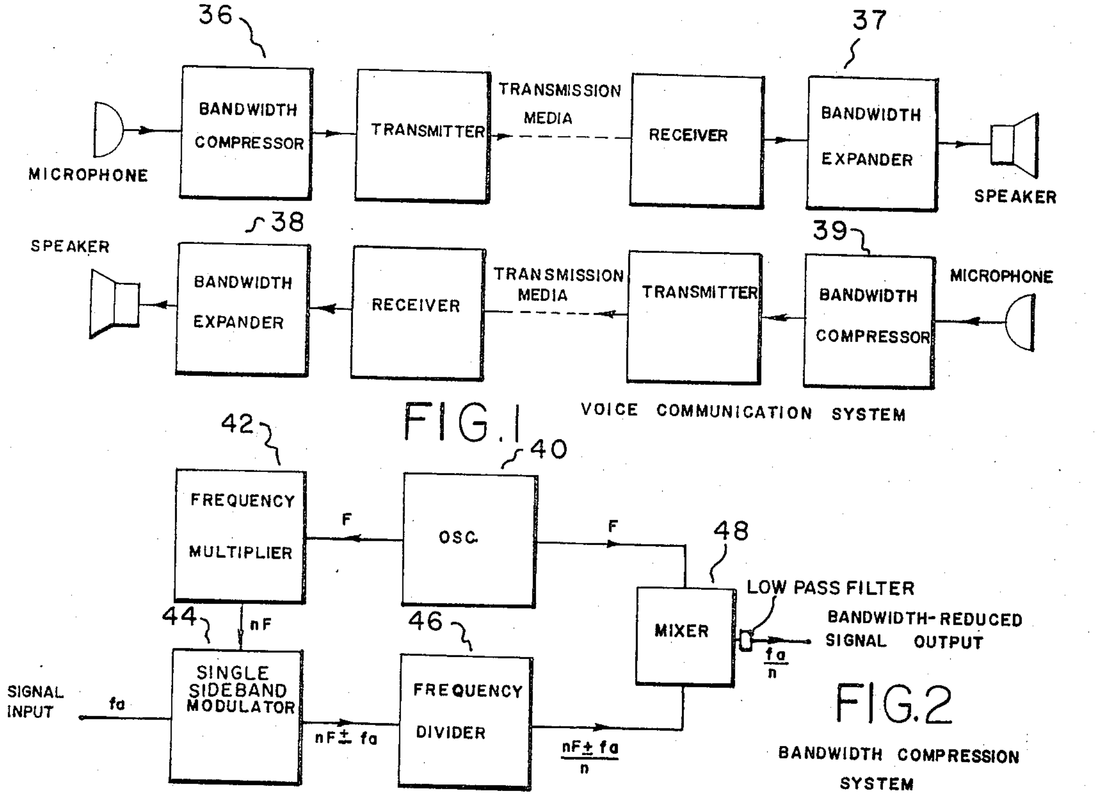
FIG. 1 is a block diagram of a communication link showing the place of bandwidth compressors and expanders of this invention in a communication system.
FIG. 2 is a block diagram showing the relationship between the various components of a bandwidth compression system and illustrating mathematical relationships between frequencies at various points in the system.

There are two principal parts to the invention: a bandwidth compressor 36 and 39 and a bandwidth expander 37 and 38. These fit into a communication system as shown in FIG. 1. The function of the bandwidth compressor is to divide all frequency components of the signal spectrum by a factor $n$ which may be an integral number (2, 3, 4, 5, - - - $x$) or an integral number plus a decimal fraction. For transmission, the spectrum elements of the signal are replaced by elements of a narrower spectrum, related on a one-to-one basis, but having frequency numbers which are smaller by the factor $n$. The frequency division is accomplished on a real-time basis; that is, a frequency component of the original signal $Fo$ having $co$ cycles duration is replaced by a frequency $F1/n$ having a duration of $co/n$ cycles. Signal amplitude information is preserved through the bandwidth reduction operation.

The bandwidth expander portion of this invention has the function, after transmission and reception of the bandwidth-reduced signal, of restoring the signal to its original form. The bandwidth expander accomplishes its function by multiplying all frequency components of the bandwidth-reduced signal by the factor $n$. This operation restores the signal to its original bandwidth, and since amplitude information is preserved through the system, the bandwidth expander output is identical to the input to the bandwidth compressor except for addition of noise which is inherent in any communication system and distortion due to non-linearities.

Figure 3:
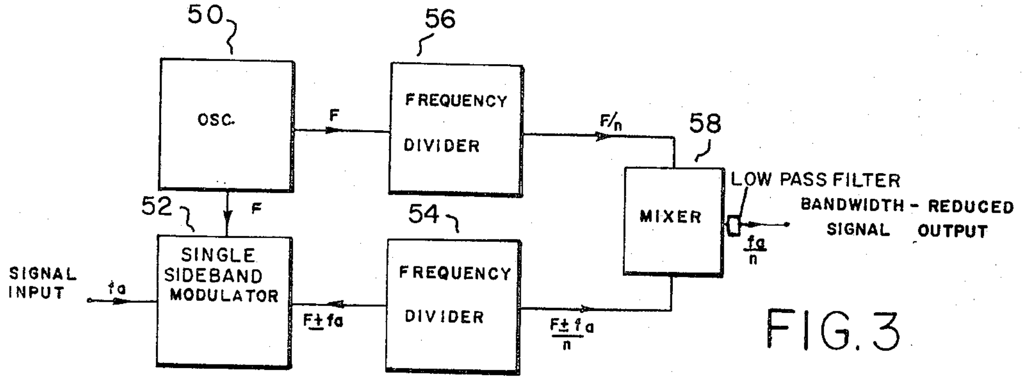
FIG. 3 shows a modified bandwidth compression system, together with symbols illustrating frequency relationships.
Figure 20:
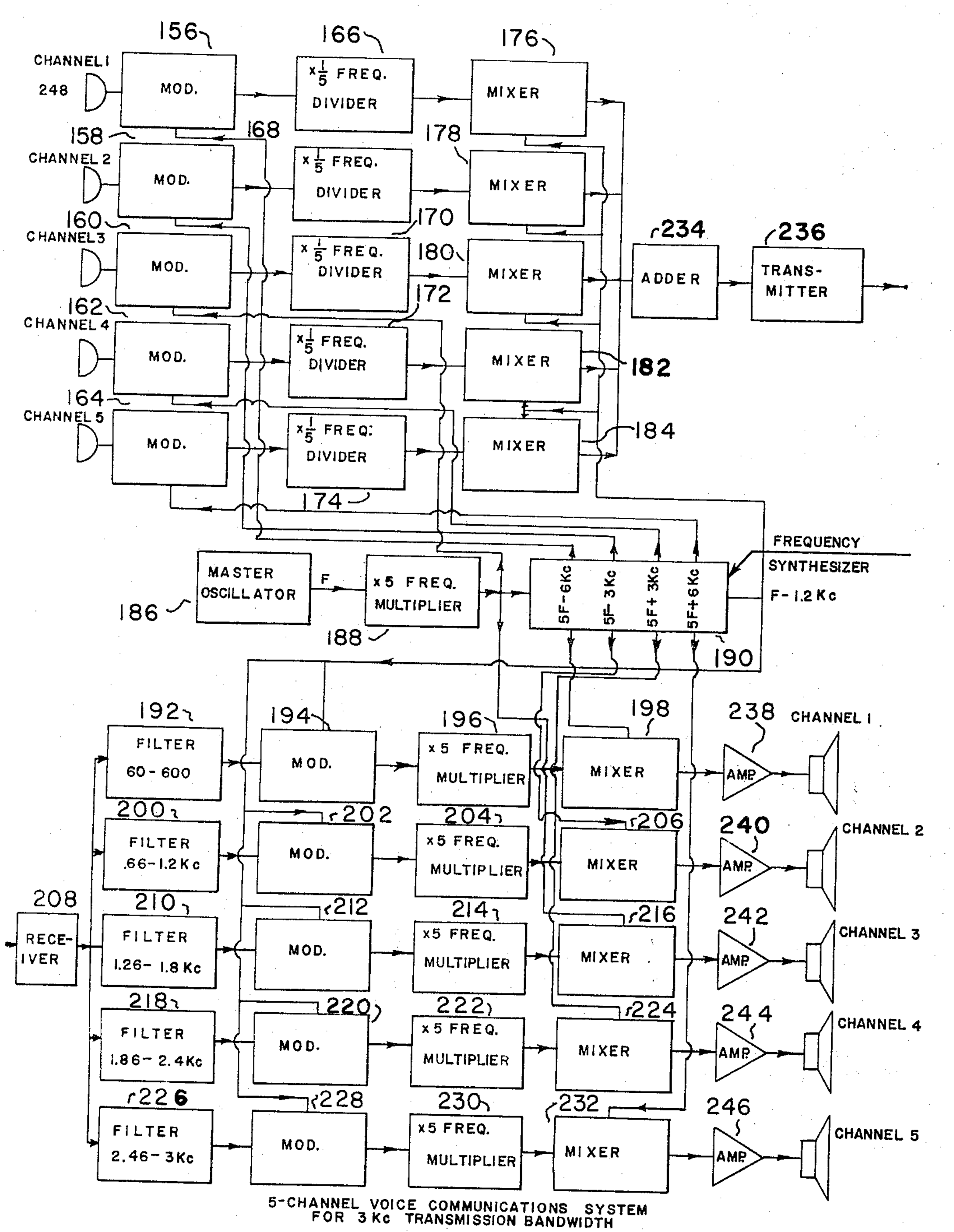
FIG. 20 is a block diagram of a five-channel voice communication system using bandwidth compression at the transmitting end and bandwidth expansion at the receiving end of a communication link.
Figure 21:
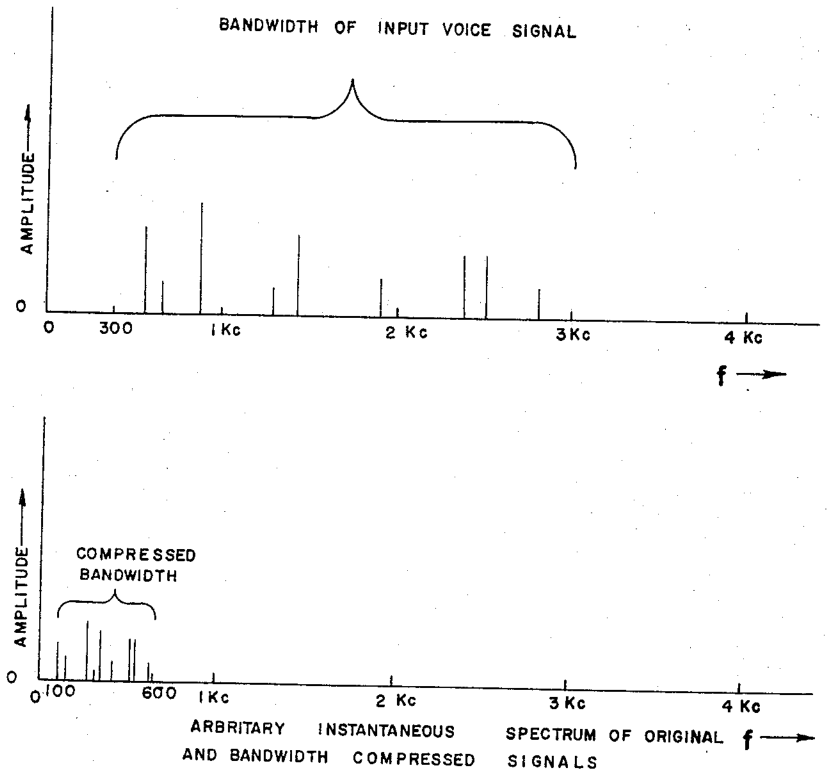
FIG. 21 is a diagram showing the relationship between the commonly transmitted voice bandwidth and a bandwidth-compressed signal; the numbers used in FIG. 21 being appropriate for channel 1 of FIG. 20.
Figure 22:
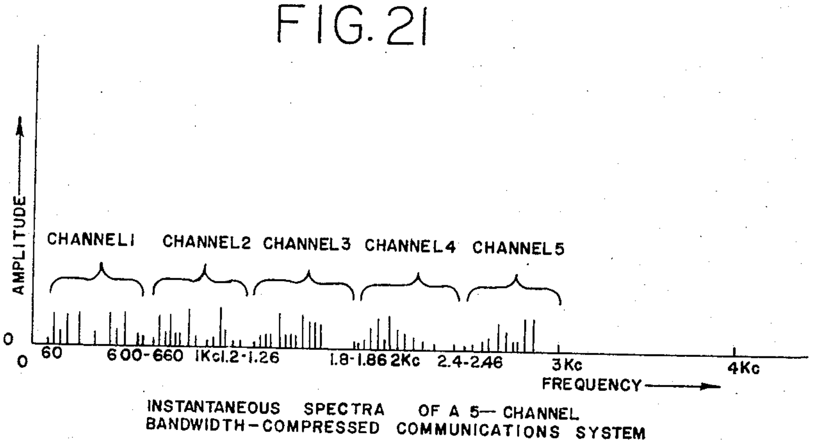
FIG. 22 is a diagram showing the frequency relationship between the bandwidth-compressed channels of FIG. 20 as they would be transmitted and received; the location and amplitude of the spectrum elements illustrated being arbitrary.

The bandwidth compressor can be comprised of the following components, as illustrated in FIG. 2: an oscillator 40, a frequency multiplier 42, a modulator 44, a frequency divider 46, and a mixer 48. Alternately, an oscillator 50, modulator 52, two frequency dividers 54 and 56, and a mixer 58 may be used, as shown in FIG. 3. A modification comprises a second oscillator, not connected to the present oscillator 40 but usable in place of the frequency multiplier 42, shown in FIG. 2. The frequency of the oscillator supplying a carrier to the modulator does not need to be harmonically related to the oscillator which supplied a carrier to the mixer. In this case, the bandwidth-reduced signal output of the bandwidth compressor system will be modulation on a subcarrier. This system is used where a number of signals are to be mixed together for transmission and separated after reception for individual expansion to their original form. FIG. 20 is illustrative of such systems using subcarriers.

The term "oscillator" is used herein to mean a source of constant voltage amplitude alternating current of a suitable constant frequency and substantially free from harmonics or frequencies other than the desired frequency. Normally, the lowest oscillator frequency used for bandwidth compression or expansion, for example the master oscillator shown in FIG. 20, will have a frequency greater by a substantial factor than the highest signal frequency. Thus, for voice signals, a minimum oscillator frequency might be 20 kc., whereas for a 4.5 mc. bandwidth video signal, an oscillator frequency of 10 mc. might be satisfactory.

The term "transmitter" as used herein, is defined as the connecting link between a bandwidth compressor and the transmission media. In the case of electrical signal transmission over wire, it could consist of a piece of wire. For signal transmission over coaxial cable, it might consist of an elaborate subcarrier generation and modulation system. For signal transmission by electromagnetic waves, it could consist of means for generating and modulating radio frequencies and radiating electromagnetic waves into space.

The term "receiver" as used herein, is defined as the connecting link between the transmission media and a bandwidth expander. Consistent with the nature of the transmission media, the receiver might consist of a piece of wire, a subcarrier demodulation system, a radio receiver, a photsensitive device used for light beam signal reception or similar means of recovering signals from a transmission media. In the case of magnetic tape recording, the receiver would consist of the magnetic pickup which translates a magnetic field pattern on a tape to an electrical signal.

Figure 4:
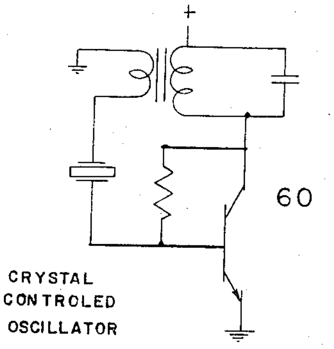
FIG. 4 is a circuit diagram of a transistor crystal oscillator.
Figure 5:
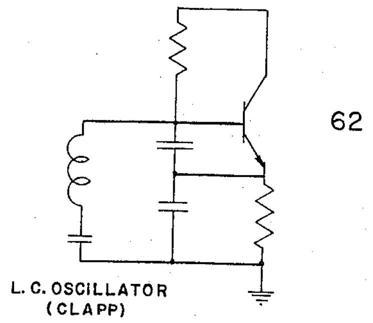
FIG. 5 is a circuit diagram of an LC transistor oscillator of the Clapp type.

The functions of the various components of a bandwidth compressor are as follows: The oscillator 40 provides a constant carrier frequency high enough in frequency to be modulated by the signal, which carrier does not vary in amplitude. If electronic, it could be a conventional quartz crystal-controlled transistor 60 or vacuum tube circuit, or an LC type such as a Clapp oscillator 62 with a high degree of frequency stability. FIGS. 4 and 5 show representative oscillators.

Figure 6:
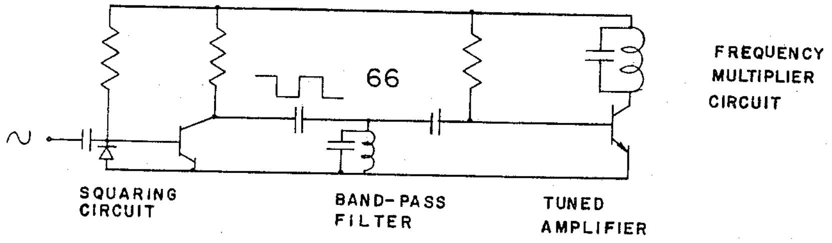
FIG. 6 is a circuit diagram disclosing an overdriven (saturation to cut-off) amplifier, a band-pass filter, and tuned amplifier.
Figure 7:
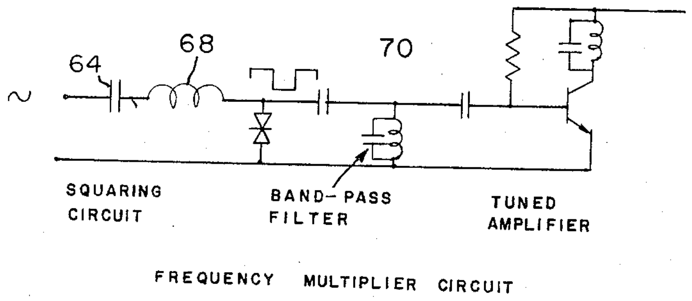
FIG. 7 is another circuit diagram of frequency multiplication means wherein the interaction of the properties of an inductance and a double anode Zener diode produce symmetrical square waves.

The frequency multiplier 42, if used, can be a conventional type in which constant carrier sine voltage is squared 64, 68 to generate harmonics which are separated by a bandpass filter 66, 70, as in FIG. 6 or FIG. 7.

Figure 8:
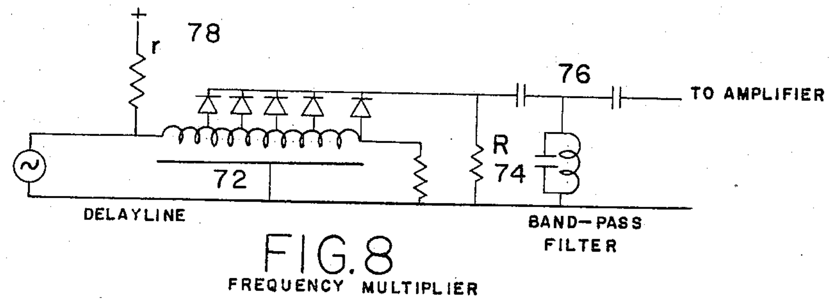
FIG. 8 is a circuit diagram of another type of frequency multiplier different from those of FIG. 6 and FIG. 7, in that squaring is not used and output can be linearly related in amplitude to input.

Another type of frequency multiplier may be used, as in FIG. 8. This frequency multiplier has an output whose frequency is a function of the input frequency and of the number of diode (or amplifier) taps on the delay line 72, and of the delay intervals between taps. The delay line has a time delay about equal to the period of the input signal (in this case a sine wave from an oscillator). As a peak of the input waveform propagates down the delay lines, one diode at a time can conduct because instantaneously one diode has a higher voltage applied than any other. Other of these diodes are back-biased by the voltage drop across the common load 74 due to current through the conducting diode. The diodes conduct sequentially. To multiply the frequency by $n$ times, $n$ diodes are spaced along the delay line at time intervals of $1/nf$, where $f$ is the input frequency. The output voltage across R74 will be a waveform consisting of frequencies $nf$, $2nf$, $4nf$, - - -, but principally $nf$. The band-pass filter 76 selects and passes the desired frequency. This type of frequency multiplier is linear with respect to input signal amplitude for voltages greater than the conduction threshold of the diodes, or with addition of a biasing voltage from a supply through resistor $r$78, is linear from zero carrier voltage to a maximum limited by diode characteristics and the value of the supply voltage.

Figure 9:
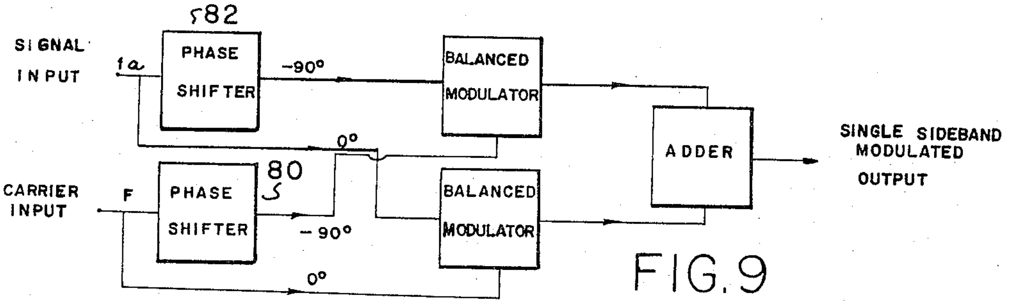
FIG. 9 is a block diagram of a single side-band modulator.

The function of the modulator 44, 52, is to impress the signal frequencies on the carrier frequency which is supplied by an oscillator. An amplitude modulator is essentially an amplitude multiplier in which the carrier voltage is varied in amplitude; the amplitude variation being proportional to the input signal amplitude. This operation produces an output consisting of a carrier, and an upper and lower side-band frequency for each signal spectrum component frequency. The preferred type of modulator eliminates one side band and the carrier. This type modulator is known as a single side-band modulator. Alternately, a modulator which varies a carrier's frequency or phase proportionally to the input signal amplitude could be used. FIG. 9 shows the component parts of a single side-band modulator as a block diagram. In order to eliminate either upper or lower side band, quadrature components of both the signal and the carrier must be obtained.

Figure 10:
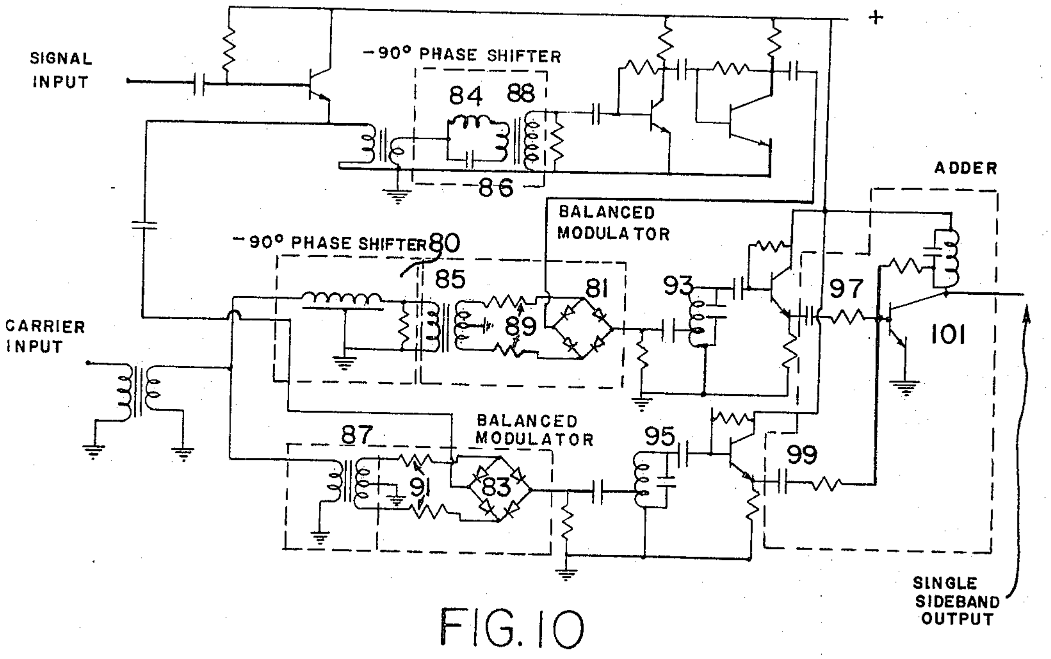
FIG. 10 is a schematic diagram of a single side-band modulator with relation to that shown in FIG. 9 and shown by blocked-off areas.

FIG. 10 shows the circuit of a single side-band modulator. Quadrature components of the carrier frequency are provided by use of the reference input phase and by use of a quarter-wave length delay line 80. Quadrature components of the signal are provided by use of the reference input phase and by a broad-band 90° phase shifting network 82.

In FIG. 10, the input carrier frequency current flows to two suppressed carrier double-sideband modulators; a 90° phase shift in the form of a quarter wavelength delay line 80 being in series with the line to one modulator. The modulator diode bridges 81 and 83 are supplied equal amplitude and opposite phase voltages with respect to electrical ground by the transformers 85 and 87 through current limiting resistors 89 and 91. The diode bridges 81 and 83 conduct on alternate half cycles. The potential at the signal input and output points will be zero with no input, but if a voltage appears on the input sides, a series of pulses will appear at the output side having the frequency of the carrier, and amplitude proportional to the input signal amplitude with input signal polarity. The band-pass filters 93 and 95 are tuned to the carrier frequency and as shown, also constitute an impedance transformer. Emitter followers 97 and 99 supply signal to the adder 101 consisting of upper and lower side bands with quadrature carriers and quadrature signals. The addition of equal amplitude side bands results in amplification of only the lower side band in the adder, as the upper side band components cancel out. Differential input to the adder amplifier would result in an upper side band only output.

The broad-band 90° phase shift for signal frequencies is provided by the inductance 84, capacitance 86, and current transformer 88, as described elsewhere. This circuit works best with a low impedance source, which is here provided by impedance transformation. For the voice audio range of 300 c.p.s. to 3 kc., the inductance 84 could be on the order of 0.75 henry and the capacitor 86 about 0.1 microfarad. A current transformer 88 turns ratio of 100:1 for each side of the primary is satisfactory.

Current through a pure inductance lags the voltages by 90°, but current amplitude decreases with increasing frequency. Current through a loss-less capacitor leads the voltage by 90°, but increases proportional to frequency. When currents through properly proportioned inductance 84 and capacitance 86 are added in a current transformer 88, as shown in FIG. 10, the output voltage of the transformer 88 is nearly constant over a wide frequency band, and is in quadrature with the voltage input to the inductance 84 and capacitance 86.

Figure 11:
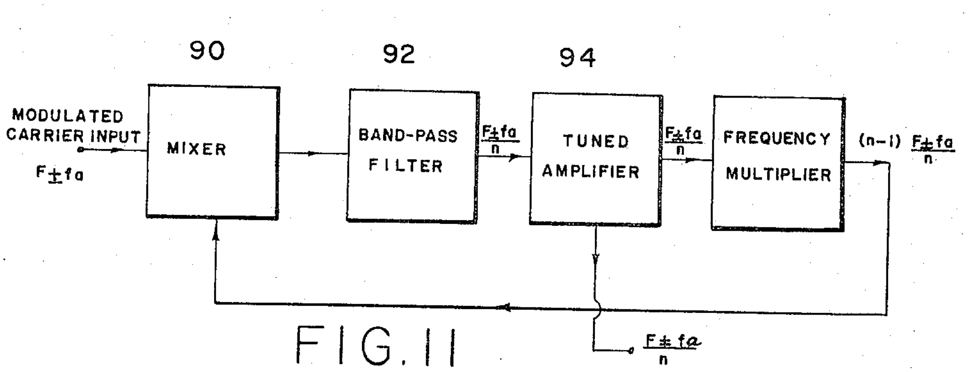
FIG. 11 is a block diagram of a frequency divider.
Figure 12:
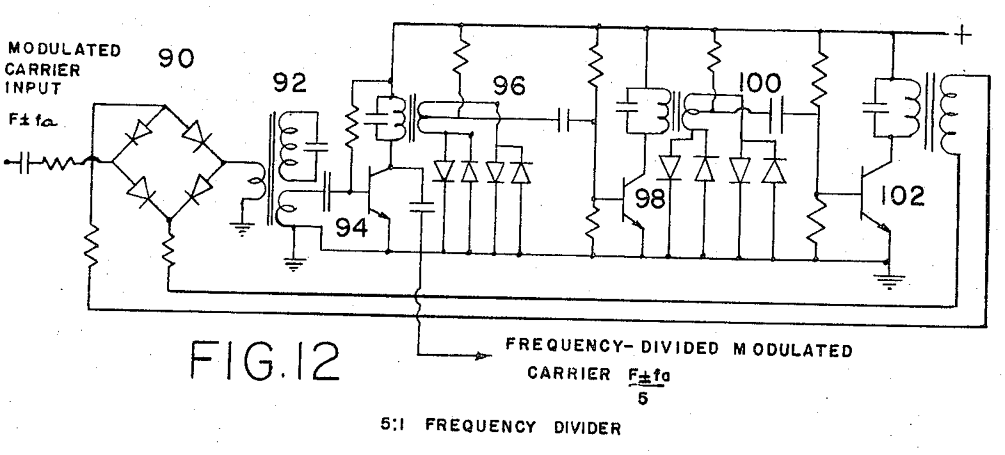
FIG. 12 is a diagram of a frequency divider having a specific 5:1 ratio.

The frequency divider 46 has the function of providing an output whose frequency is related to the modulator output by a factor $1/n$. FIG. 11 shows a frequency divider block diagram and FIG. 12 shows a frequency divider for $n=5$. The input modulated carrier is mixed in the mixer 90 (essentially a multiplication) with an amplitude limited voltage of frequency $(n-1)(F\pm f_a)/n$. Sum and difference frequencies are obtained and the difference frequency is separated out by the band-pass filter 92 and amplified at 94. The amplifier 94 provides the output $(F\pm f_a)/n$. In the illustrated divider, the amplifier 94 output is doubled in frequency by a full-wave rectifier circuit 96 and amplified by a tuned amplifier 98. The carrier $2(F\pm f_a)/5$ is again frequency doubled at 100 and amplified at 102 to obtain $4(F\pm f_a)/5$ which is amplitude limited. The final amplifier 102 output is then mixed with the input $(F\pm f_a)$ to obtain a difference $(F\pm f_a)/5$.

Figure 13:
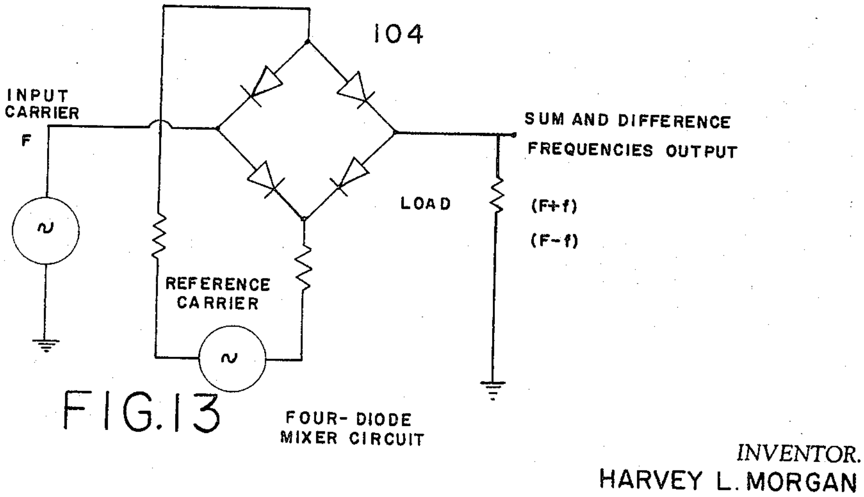
FIG. 13 is a diagram of a circuit having a four-diode double side-band suppressed carrier modulator.

The mixer 90 has the function of multiplying two frequencies together to obtain sum and difference components, as described above. A simple single diode type will work, but the four-diode type such as is used in the frequency divider is preferred since the output does not contain the carriers; only the sum and difference products. The four diode mixer 104 of FIG. 13 conducts on alternate half-cycles of the reference carrier. The signal carrier varies the duration of conduction, hence modulates the output current according to the phase relation between the two carriers.

Figure 14:
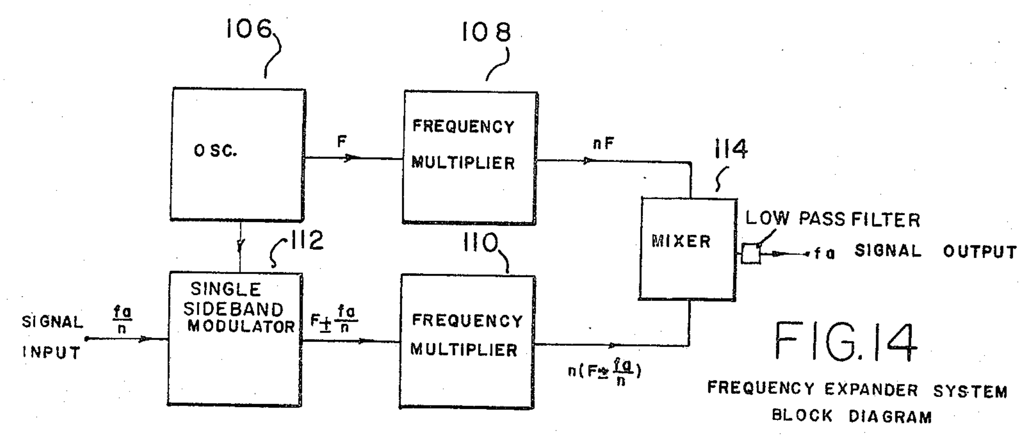
FIG. 14 is a block diagram of a frequency expander system, illustrating the relations between components and the mathematical relations between frequencies involved.
Figure 15:
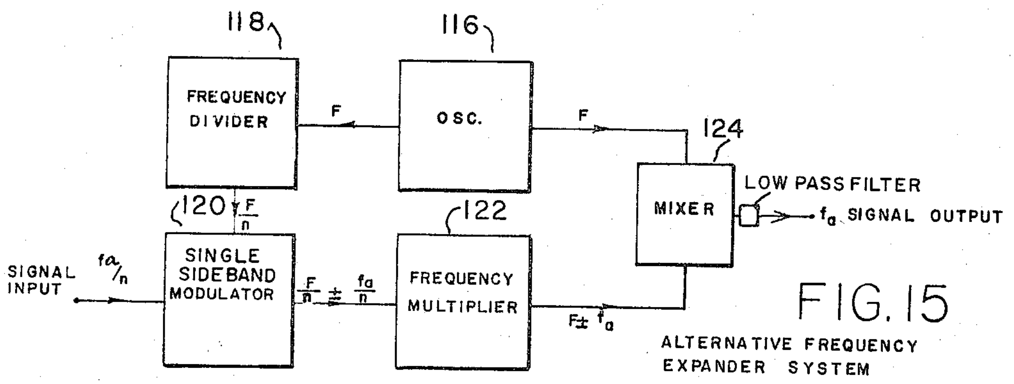
FIG. 15 is a block diagram of a modified frequency expander.
Figure 16:
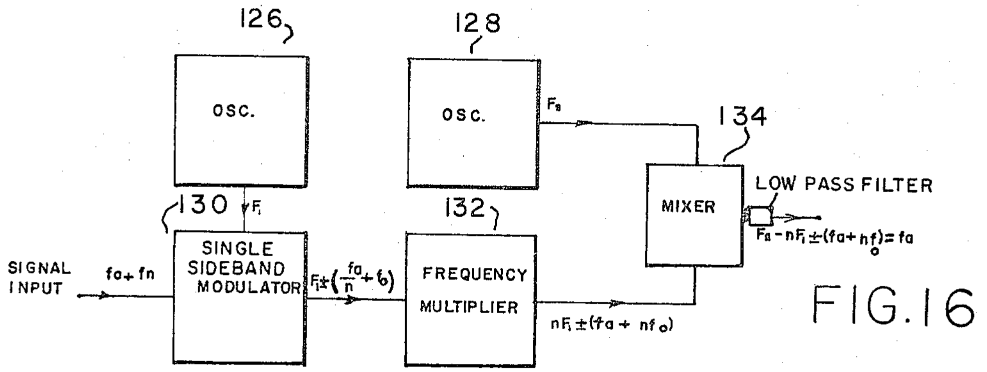
FIG. 16 is a block diagram of a further modified frequency expander.

The bandwidth expander can be comprised of the following components, as illustrated in FIG. 14: an oscillator 106, two frequency multipliers 108 and 110, a modulator 112, and a mixer 114. Alternatively, it may be comprised of an oscillator 116, frequency divider 118, modulator 120, frequency multiplier 122, and a mixer 124, as in FIG. 15. Another configuration, shown in FIG. 16, would use two oscillators 126 and 128, not necessarily related in frequency by the factor $n$ of frequency expansion, a modulator 130, frequency multiplier 132, and a mixer 134. The type shown in FIG. 16 would be used where a number of signals were to be passed simultaneously through a communication system. All but one signal would have to be superimposed on subcarriers for separation of the receiver.

The functions of the oscillator 106, 116, 126, and 128, modulator 112, 120, and 130, frequency divider 118, frequency multiplier 108, 110, 122, and 132, and mixers 114, 124, and 134 of the bandwidth expander are the same as the similarly named components of the bandwidth compressor. The principal difference would be in carrier frequency. The combination and arrangements differ, however, because in a bandwidth compressor, the modulator is always followed by a frequency divider and in a bandwidth expander, the modulator is always followed by an amplitude linear frequency multiplier. The difference in frequency of operation for components of bandwidth compressors and expanders for a given system will be the ratio of bandwidth compression, with compensation for subcarriers frequency offsets. FIG. 20 shows the frequency relationships for a system for $n=5$.

Figure 17:
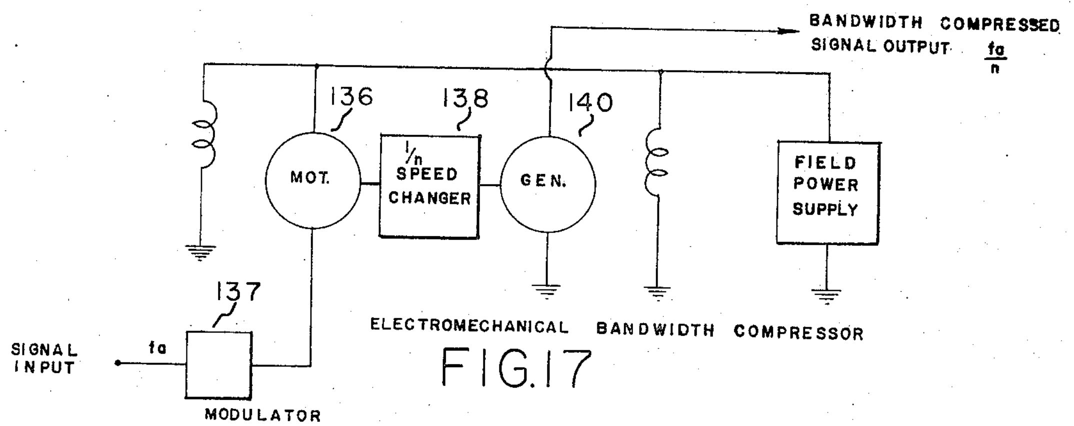
FIG. 17 is a diagram of an electromechanical bandwidth compressor consisting of a motor and generator coupled by speed reduction means; the motor armature current being modulated about a mean value proportional to a signal.
Figure 18:
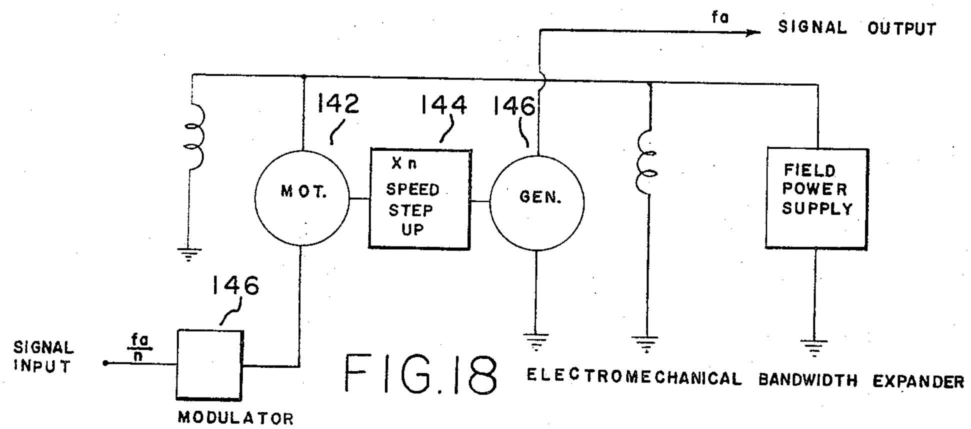
FIG. 18 is a diagram of an electromechanical bandwidth expander which has a speed step-up means rather than a speed reduction means as in the bandwidth compressor.
Figure 19:
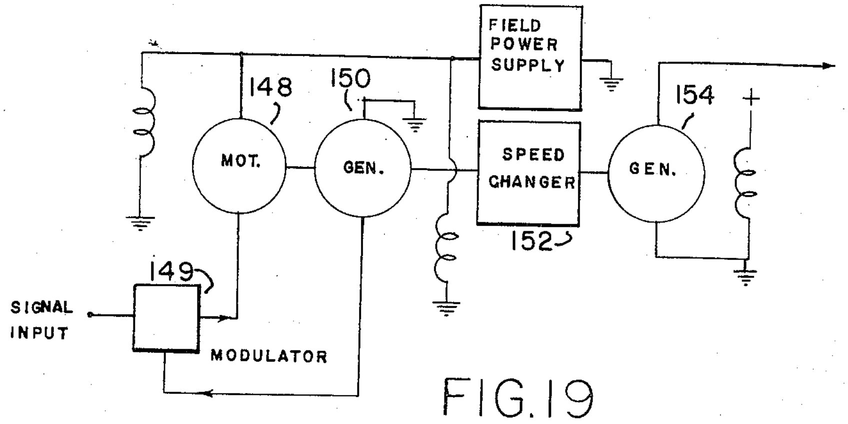
FIG. 19 is a diagram of an electromechanical bandwidth changer, which might be either a compressor or expander, provided with an additional generator directly connected to the motor for the purpose of providing negative feedback to the modulator.

The functions of bandwidth compression and bandwidth expansion can be performed by an electromechanical equivalent of the electronic systems described above. A set of systems is shown in FIG. 17 and FIG. 18. The carrier is provided or simulated by rotation (or linear motion) of armature 136 poles past stator poles, the frequency with which any stator pole piece is passed by armature pole pieces being the equivalent carrier. A nominal value electromechanical carrier frequency (product of revolutions per second and number of armature pole pieces for rotary motion) is provided by a steady state current through the motor. Speed of rotation is varied by modulating the current through the motor, thus changing the electromechanical carrier frequency. When a signal spectrum modulates the motor current, the electromechanical carrier frequency changes with a resulting change in rate of armature motion; the amount of carrier frequency change being proportional to amplitude of signal. Armature speed of response must be such that the maximum frequency of the spectrum whose bandwidth is being reduced will produce an adequate change in armature motion to be propagated through the system. Motors with low-inertia armatures, such as the so-called printed circuit armatures, and particularly in conjunction with negative feed-back, as illustrated in FIG. 19, can be made adequate for voice signal systems. A generator on a common shaft with a motor having the same number of pole pieces will produce a voltage which will be modulated by the changing rate of armature motion. The frequency components of the modulation will be the same as those in the signal, so the output of such a generator would be suitable for negative feedback to the modulator 149. However, if the generator electromechanical carrier frequency were different due to differences in the number of pole pieces or difference in rate of armature motion due to mechanical speed changing means, the output frequency components of a generator attached to such a motor would differ from the original signal by the ratio of the number of pole pieces or ratio of rates of armature motion. By use of means of speed reduction 138 or a suitable ratio of motor pole pieces to generator pole pieces, bandwidth compression of a signal spectrum can be accomplished. By means of speed step-up 144 or a suitable ratio of motor pole pieces to generator pole pieces, bandwidth expansion of a signal spectrum can be accomplished. Use of the principle of pole piece ratios will eliminate the friction losses, back-lash, and inertia of a mechanical speed changer, so is a preferred configuration.

A representative system for putting a number of communication channels through transmission systems of adequate bandwidth is shown in FIG. 20. Three kilocycles to 300 cycles per second is a common voice channel bandwidth. The multiple channel system of FIG. 20 will transmit and receive 5 such voice channels through 3 kilocycles of transmission bandwidth. This invention is not limited to a compression ratio of 5, which is merely illustrative. A compression ratio of about 30 is thought to be the practical limit on voice transmission.

The system, shown in FIG. 20, consists of 5 identical channels for compression and expansion of voice spectrum frequencies. The microphone 248 of channel 1 provides signal to a modulator 156 which modulates the ($5F-6$kc.) frequency. The frequency divider 166 divides the modulated carrier frequency by a factor $n=5$. In the mixer 176, the frequency divided modulated carrier is beat against the ($5F-6$ kc.) carrier which is also divided by 5. The difference frequency output of the mixer is the bandwidth compressed signal which is transmitted. The other four channel signals modulate carriers ($5F-3$ kc.), $5F$, ($5F+3$kc.), and ($5F+6$kc.), so that after frequency division, they are superimposed on subcarriers of 600, 1200, 1800, and 2400 c.p.s. The bandwidth allowed each signal channel is 540 c.p.s.

After reception by the receiver 208, a set of filters 192, 200, 210, 218, and 226, separate the 5 channels on the basis of subcarrier frequency difference. The bandwith compressed signals modulate 194, 202, 212, and 228 the master oscillator 186 carrier F. The modulated carriers are frequency multiplied 196, 204, 214, 222, and 230, then mixed 198, 206, 216, 224, and 232, with the same carrier frequency as used in frequency compression. The mixer difference will then be zero-based (the subcarriers will be removed) and the signal will have the original spectrum and form.

It will be obvious to those skilled in the art that various modifications of the invention may be resorted to in a manner limited only by a just interpretation of the following claims.

I claim:

1. In a means for information transmission at reduced transmission media bandwidth, wherein: a complex variable frequency information-bearing signal having a bandwidth A is transmitted with a bandwidth $A/n$, where $n$ is a number greater than 1, as a second complex variable frequency information-bearing signal having frequencies related to frequencies in said first complex variable frequency information-bearing signal by a ratio $1/n$, the serially connected combination of: $1/n$ bandwidth compression means, transmitter means, transmission media means, receiver means, and a times $n$ bandwidth expander means, said bandwidth compression means consisting of the combination of modulation means having inputs of said first complex variable frequency information-bearing signal and continuous wave carrier, continuous wave oscillator means providing said continuous wave carrier to said modulation means, amplitude linear frequency division by a factor of $n$ means, having input from said modulation means, second frequency division by a factor $n$ means having input of said continuous wave carrier from said continuous wave oscillator means, demodulator means having inputs from said amplitude linear frequency division by a factor $n$ means and said second frequency division by a factor $n$ means, and low pass filter means having input from said demodulator means and output to said transmitter means, said times $n$ bandwidth expander consisting of the combination of second modulation means having inputs from said receiver means and a second continuous wave carrier, a second continuous wave oscillator means providing said second continuous wave carrier to said second modulation means, amplitude linear frequency multiplication by a factor $n$ means having input from said second modulation means, second frequency multiplication by a factor $n$ means, having input of said second continuous wave carrier from said second continuous wave oscillator, second demodulator means having inputs from said amplitude linear frequency multiplication by a factor $n$ means and said second frequency multiplication by a factor $n$ means, and a low pass filter means having input from said second demodulator means and output of a replica of said first complex variable frequency information-bearing signal.

2. In a means for bandwidth expansion of a complex variable frequency information-bearing signal of bandwidth $A/n$ by a factor of $n$, where $n$ is a number greater than 1, to a second complex variable frequency information-bearing signal of bandwidth A, the combination of: single sideband modulation means having inputs of said first complex variable frequency information-bearing signal and continuous wave carrier, continuous wave oscillator means providing said continuous wave carrier to said single sideband modulation means, amplitude linear frequency multiplication by a factor $n$ means having input from said single sideband modulation means, second frequency multiplication by a factor $n$ means having input of said continuous wave carrier from said continuous wave oscillator means, demodulator means having inputs from said amplitude linear frequency multiplication by a factor $n$ means and said second frequency multiplication by a factor $n$ means, low pass filter means having input from said demodulator means and output of said second complex variable frequency information-bearing signal.

3. In a means for bandwidth expansion by a factor $n$, where $n$ is a number greater than 1, of a complex variable frequency information-bearing signal of bandwidth $A/n$ to a second complex variable frequency information-bearing signal of bandwidth A, the combination of: single sideband modulation means having inputs of said first complex variable frequency information-bearing signal and continuous wave carrier, continuous wave oscillator means providing said continuous wave carrier to said single sideband modulation means, amplitude linear frequency multiplication by a factor $n$ means having input from said single sideband modulation means, a second frequency multiplication by a factor $n$ means having input of said continuous wave carrier from said continuous wave oscillator means, mixer means having inputs from said amplitude linear frequency multiplication by a factor $n$ means and said second frequency multiplication by a factor $n$ means, low pass filter means having input from said mixer means and output consisting of said second complex variable frequency information-bearing signal.

4. In a means for bandwidth compression by a factor $n$, where $n$ is a number greater than 1, of a complex variable frequency information-bearing signal of bandwidth A to a second complex variable frequency information-bearing signal of bandwidth $A/n$, the combination of: single sideband modulation means having inputs of said first complex variable frequency information-bearing signal and continuous wave carrier, continuous wave oscillator means providing said continuous wave carrier to said single sideband modulation means, mixer means having inputs of single sideband modulated signal from said single sideband modulation means and a second carrier having a frequency relation to said single sideband modulated signal $$\frac{n-1}{n},$$

difference frequency filter means having input from said mixer means, amplifier means having input from said difference frequency filter means, frequency multiplication by a factor of $(n-1)$ means having input from said amplifier means and output of said second carrier connected to said first mixer means, frequency division by a factor $n$ means having input of said first continuous wave carrier from said continuous wave oscillator means, second mixer means having inputs from said amplifier means and said second frequency division by a factor of $n$ means, and low pass filter means having input from said second mixer means and difference frequency output of said second complex variable frequency information-bearing signal.

References Cited

UNITED STATES PATENTS

| | | | |
|---|---|---|---|
| 2,452,048 | 10/1948 | Hansen et al. | 328—15 X |
| 2,852,671 | 9/1958 | Cohen | 179—15.55 X |
| 3,188,483 | 6/1965 | Steiner | 328—16 X |

JOHN W. CALDWELL, *Primary Examiner.*

ROBERT L. GRIFFIN, *Examiner.*

J. T. STRATMAN, *Assistant Examiner.*